FIG. 8.
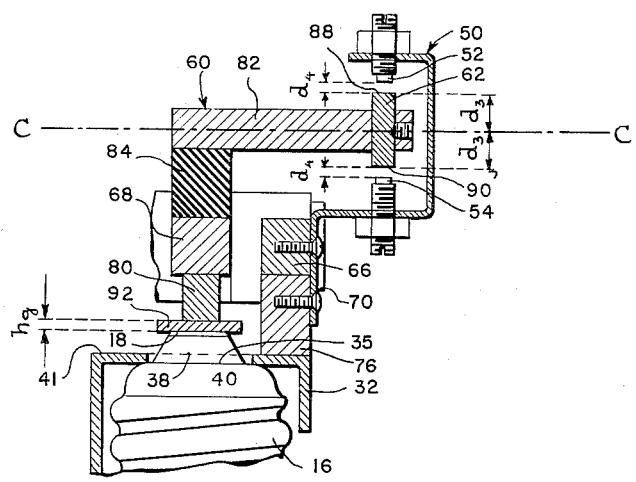
FIG. 7.
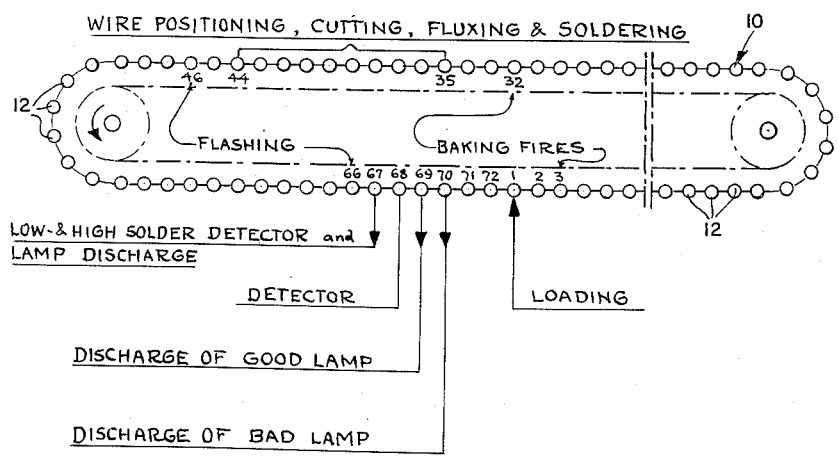
INVENTORS
BERNARD CHAUVIN
FREDERICK T. MAY
BY
ATTORNEY.

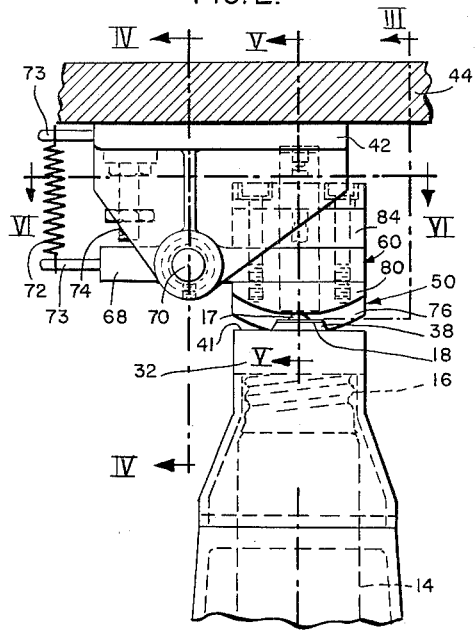
FIG. 2.
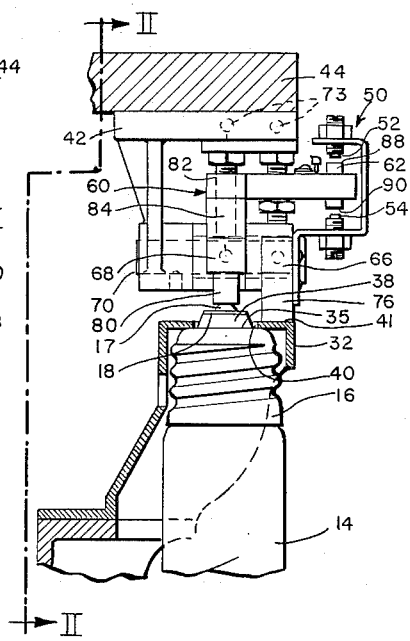
FIG. 3.
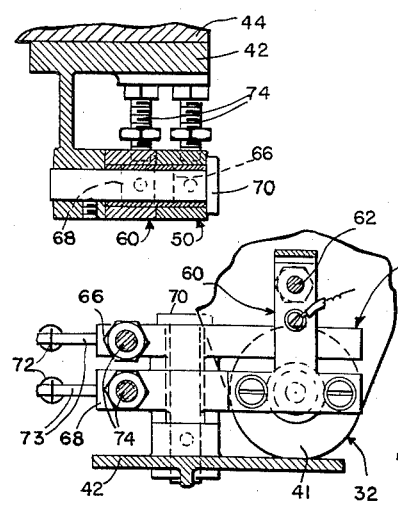
FIG. 4.
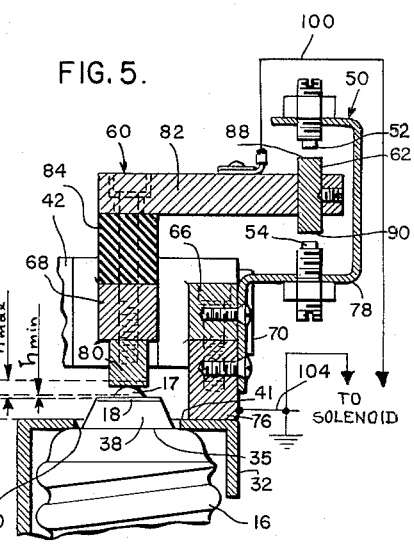
FIG. 5.
FIG. 6.
INVENTORS.
BERNARD CHAUVIN
FREDERICK T. MAY
BY
ATTORNEY.

United States Patent Office 3,017,991
Patented Jan. 23, 1962

3,017,991
ARTICLE INSPECTION DEVICE
Bernard Chauvin, Cedar Grove, and Frederick T. May, Verona, N.J., assignors to Westinghouse Electric Corporation, East Pittsburgh, Pa., a corporation of Pennsylvania
Filed Mar. 25, 1959, Ser. No. 801,809
5 Claims. (Cl. 209—88)

The present invention relates to basing machines utilized in the manufacture of incandescent lamps and the like, and more particularly to an automatic solder-inspection device for such a basing machine.

Heretofore, incandescent lamps have been sealed and exhausted on turret-type sealex machines, and more particularly, the exhausted incandescent lamps have been based on turret-type basing machines of the type shown in U.S. Patent No. 1,760,507, issued May 27, 1930 to W. W. Loebe et al. Such a basing machine has a rotatable turret provided with a plurality of lamp-carrying heads (through which a portion of the base projects) the heads being indexed through a like number of work stations. The machined tolerances on the heads and frame of this turret-type basing machine are ±.001" thereby insuring that the height of each head (entering a specific work station, such as the solder-inspection station) above the frame varies no more than ±.001".

Hence, the uniform orientation of the projecting portion of the lamp base in the heads has permitted use of an inspection device (similar to the device shown in U.S. Patent No. 2,393,246, issued January 22, 1946 to H. T. Hallowell and used to inspect the thickness of the terminal flange of a priming-head assembly) at the solder-inspection station to inspect the height of the solder above the base eyelet.

This conventional inspection device has a datum sleeve which circumscribes the detecting plunger and engages the head to provide a fixed datum from which the thickness of the terminal flange may be measured by the detecting plunger. The datum sleeve carries an integral rod which (when lowered with the datum sleeve) causes the switch-operating lever to pivot from the horizontal-starting position during the detecting operation and to actuate either one of a pair of fixed switches, when the datum sleeve and the detecting plunger are abnormally positioned with respect to each other.

The turret-type basing machine due to its rotating motion and relatively large weight is limited by the factors of momentum and inertia to index speeds of 1200 to 1500 indexes (and hence based lamps) per hour. Because of the stresses produced in such turret-type basing machines during their operation and the limits of current engineering materials, these production figures represent the maximum production rates for this turret type basing machine.

The demand for higher production has caused substitution of a conveyor-type basing machine (similar to the machine shown in U.S. patent application, Serial No. 449,482, filed December 17, 1958, by D. Mullan et al., and assigned to the same assignee as the subject application) for the conventional turret-type basing machine. While such a conveyor-type basing machine is capable of carrying a larger number of heads than the conventional turret-type machine, such heads ride by means of rollers on peripheral tracks disposed on the frame of the conveyor-type basing machine. As a result the height of individual heads above the frame of the conveyor-type basing machine entering the solder-inspection station (where the height of the solder above the base eyelet is inspected) varies as much as ±1/16" or ±.063". It is obvious that the ±1/16" variation in the height of the heads of the conveyor-type basing machine above the frame renders an inspection device similar to the patented device useless (without constant adjustment) for the solder inspection operation.

It is the general object of the present invention to avoid and overcome the foregoing and other difficulties of and objections to prior art practices by the provision of an improved inspection device for a conveyor-type fabricating machine, which device will reliably and accurately ascertain whether the height of a portion of an article projecting above the article-carrying head is within specified limits.

Another object of the present invention is the provision of an improved solder-inspection device which automatically adjusts to compensate for variations in the height of the basing heads of a conveyor-type basing machine above the frame, when such heads enter the solder-inspection station.

The aforesaid objects of the present invention and other objects which will become apparent to those skilled in the art as the description proceeds are achieved by providing an article-inspection device for a conveyor-type fabricating machine having an article-supporting means, the article-inspection device comprising a floating datum head provided with a pair of datum contacts and movable into engagement with the portion of the article-supporting means in which the article is nested and through which the article projects and a floating-detecting head movable into engagement with the projecting portion of the article and provided with a pair of detecting contacts, one of which detecting contacts engages a datum contact when the height of the projecting portion of the article above the article-supporting means exceeds specified limits.

For a better understanding of the present invention reference should be had to the accompanying drawings wherein like numerals of reference indicate similar parts throughout the several views and wherein:

FIG. 2 is a vertical-sectional view along the line II—II of FIG. 3 in the direction of the arrows and showing the details of a datum head and a detecting head of the solder-detecting device shown in FIG. 1.

FIG. 3 is a fragmentary view similar to FIG. 1 and taken along the line III—III of FIG. 2 in the direction of the arrows.

FIG. 4 is a fragmentary vertical-sectional view along the line IV—IV of FIG. 2 in the direction of the arrows and showing the adjustable stop means for the datum head and the detecting head.

FIG. 5 is a vertical-sectional view along the line V—V of FIG. 2 in the direction of the arrows showing schematically the electrical connections to the datum head and detecting head.

FIG. 6 is a horizontal-sectional view along the line VI—VI of FIG. 2 in the direction of the arrows.

FIG. 7 is a diagrammatic plan view of the conveyor-type basing machine which utilizes the improved solder-inspection device of the present invention.

FIG. 8 is a view identical to FIG. 5 but showing the calibration and adjustment of the datum and detecting heads.

Figure 1:
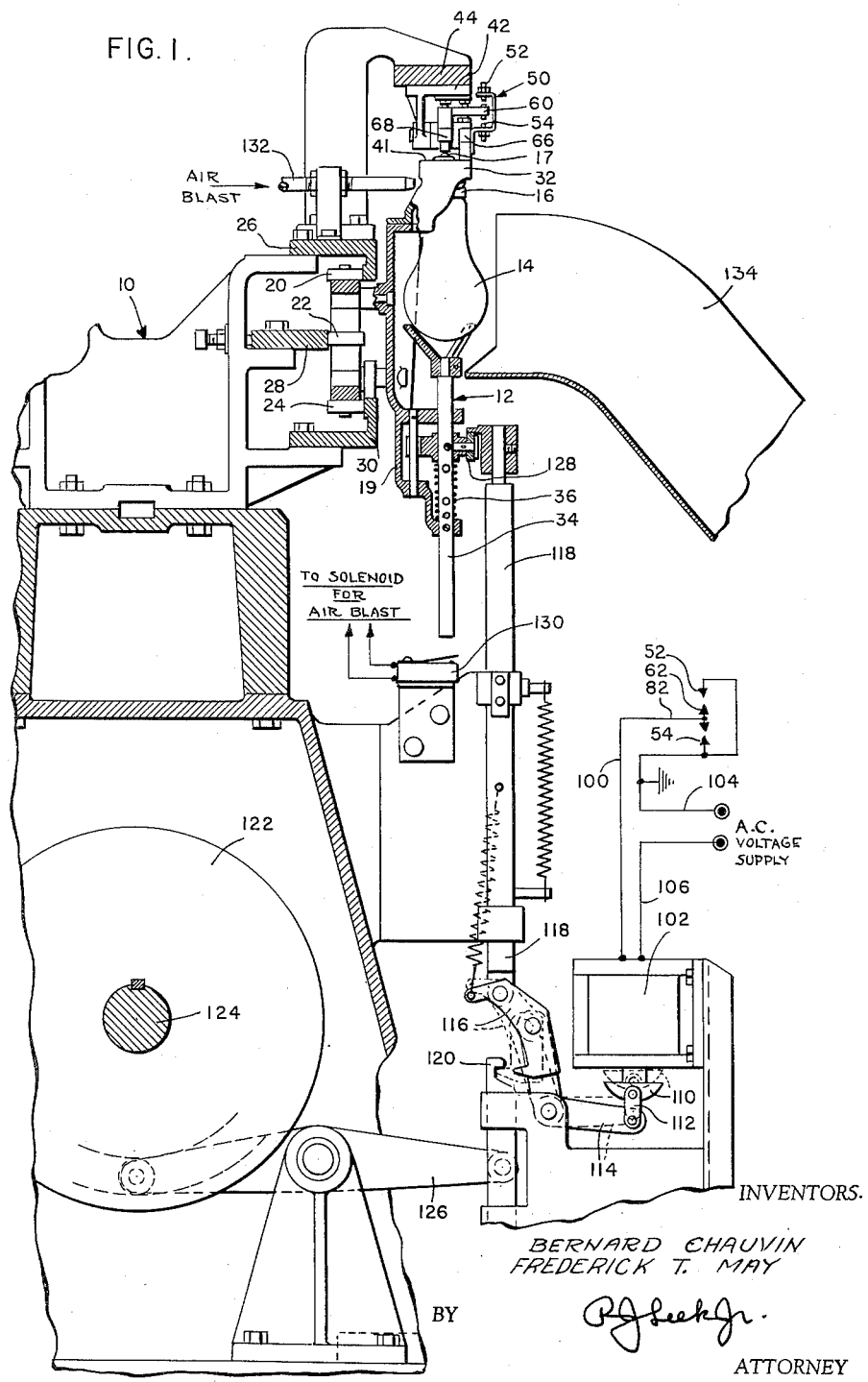
FIG. 1 is a side-elevational view, partially in section, of a solder-inspection station of a conveyor-type basing machine and having incorporated therein the solder-inspection device of the present invention.

Although the principles of the present invention are broadly applicable to the detecting of the thickness or length of a projecting portion of an article secured in the head of an article-fabricating machine, the present invention is particularly adapted for use in conjunction with a conveyor-type basing machine for applying the base to incandescent lamps and hence it has been so illustrated and will be so described.

With specific reference to the form of the present invention illustrated in the drawings, and referring particularly to FIG. 7, a conveyor-type basing machine (of the type shown in U.S. application Serial No. 449,482, filed December 17, 1954 by D. Mullan et al. and assigned to the same assignee as the present application) is indicated generally by the reference numeral 10.

Since the conveyor-type basing machine 10 per se, forms no part of the present invention it is deemed sufficient to say that such machine 10 is provided with a plurality of basing heads 12 which are indexable by a conventional mechanism (not shown) through a like number of work stations. These work stations include a loading Station "1," where an incandescent lamp 14 (FIG. 1) having a cement-filled base 16 threaded thereon is loaded into a basing head 12. From Station "3" through Station "32," the base 16 is baked to cure the basing cement. At Stations "35" through "44" the lead wires of the lamp 14 are positioned, cut, flexed and soldered to the base 16. From Station "46" to Station "66," the lamp 14 is flashed or seasoned. When the lamp 14 indexes into Station "67," the solder-detecting station, the height of the eyelet-solder connection 17 above a center eyelet contact 18 of the base 16 is measured (FIG. 5) to ascertain whether it falls within the specified limits, namely, $h_{max}$ (.060") and $h_{min}$ (.030") by the improved solder-inspection device of the present invention.

Referring now to FIG. 1, it will be noted that each of the basing heads 12 comprises a body 19 movable from station to station in the conventional manner by means of rollers 20, 22 and 24, which rollers are in respective engagement with stationary cam tracks 26, 28 and 30 disposed on the periphery of the frame of the conveyor-type basing machine 10. Such body 19 of the basing head 12 has a base-receiving nest 32 affixed to the upper portions thereof and a bulb-supporting holder 34, reciprocable in the lower portions of the body 19. The bulb-supporting holder 34 is biased upwardly, as viewed in FIG. 1, by means of a spring 36 so that a top shoulder 35 (FIGS. 3, 5 and 8) of the base 16 rests against the lower surface of the top of the base-holding nest 32, thereby permitting a portion of the glass insulator 38, the center-eyelet contact 18 and the eyelet-solder connection 17 to project through an aperture 40 in the base-receiving nest 32.

It will be understood by one skilled in the art that although the height of the individual basing heads 12 above the frame of the conveyor-type basing machine 10 may vary as much as $\pm 1/16"$ or $\pm .063"$, the thickness of the top portion of the base-holding nest 32, as viewed in FIGS. 1 and 3, may be machined with a tolerance of $\pm .001"$. In addition, the glass insulator 38 and center-eyelet contact 18 of the base 16 may likewise be fabricated within a similar tolerance of $\pm .001"$ thereby permitting the use of the top surface 41 of the base-holding nest 32 by the solder-inspection device of the present invention, as a datum plane for the inspection of the height of the eyelet-solder connection 17 above the center-eyelet contact 18.

*Solder-inspection device*

In order to mount the solder-inspection device of the present invention at Station "67," the solder-inspection station (FIG. 1), of the conveyor-type basing machine 10 in operative relation to a basing head 12 at such station, a body 42 of the solder-inspection device is affixed to the horizontal underface of an inverted L-shaped bracket 44 upstanding from the frame portions of the conveyor-type basing machine 10.

The solder-inspection device has a floating datum head 50 (FIGS. 2, 3, 5 and 6) which is provided with a pair of adjustable datum contacts 52 and 54, such datum head with its contacts being movable with respect to the body 42 by engagement of the datum head 50 with the top surface 41 of the base-holding nest 32 as the basing head 12 indexes into the solder-inspection station, thereby adjusting the position of such datum contacts to compensate for variations in the height of a basing head 12 above the frame portions of the conveyor-type basing machine 10, as the basing head 12 enters the solder-inspection station.

In addition, the solder-inspecting device has a floating detecting head 60 provided with a vertically disposed adjustable contact bar 62 movable by the detecting head between the datum contacts 52 and 54. Such detecting head 60 itself is movable by the eyelet-solder connection 17 as the basing head 12 indexes into the solder-inspection station to cause the contact bar 62 to engage one of the datum contacts 52 and 54 if the height of the eyelet-solder connection 17 above the center eyelet contact 18 is outside the predetermined limits $h_{max}$ (.060")—$h_{min}$ (.030").

The structure utilized to achieve the above-described operation of the solder-inspection device of the present invention (as shown in FIGS. 2–6) comprises a datum lever 66 and a detecting lever 68 pivotable in side-by-side engagement on a bolt 70 secured in the body 42 of the solder-inspection device. During the indexing of a basing head 12 into and out of Station "67," the solder-inspection station of the conveyor-type basing machine 10, when the floating datum head 50 and the detecting head 60 are not in engagement with either the top surface 41 of the base-receiving nest 32 or the eyelet-solder connection 17, respectively, the left-hand portions (FIGS. 2 and 6) of the above mentioned datum lever 66 and the detecting lever 68 at this time are biased upwardly, as viewed in FIGS. 2–5, by tension springs 72 into engagement with adjustable stops 74 depending from the upper portion of the body 42. These tension springs 72 extend between pins 73 projecting from the upper portion of the body 42 and the respective datum lever 66 and detecting lever 68.

As shown in FIGS. 2, 3 and 5 the datum head 50 has a arcuate-shaped datum contact means, such as a datum shoe 76, affixed to the datum lever 66 for use as the contact member which engages the top surface 41 of the base-receiving nest 32. The adjustable lower-limit contact 52 and adjustable upper-limit contact 54 are disposed in a contact holder 78 affixed to the datum lever 66 and the datum shoe 76 (FIG. 5) as by screws. The detecting lever 68 of the detecting head 60 carries an arcuate-shaped detecting contact means, such as a detecting shoe 80, similar to the shoe 76, which is engageable with an eyelet-solder connection 17 and such lever 68 also carries an arm 82 in which the adjustable contact bar 62 is mounted with the arm 82 being electrically insulated by an insulating spacer 84 from the detecting lever 68.

In order to calibrate the solder-inspection gauge of the present invention for the inspection of the height of eyelet-solder connection 17 above the center eyelet contact 18 within limits $h_{max}$ (.060") —$h_{min}$ (.030"), it will be understood from a consideration of FIG. 8 that the top surface 88 and the bottom surface 90 of the vertical contact bar 62 are each disposed a distance $d_3$ from the longitudinal centerline C—C of the arm 82. These top surfaces, as viewed in FIGS. 3 and 5, function respectively, as a top detecting contact and a bottom detecting contact. A base 16 is inserted into the base-receiving nest 32 and the detecting shoe 80 is raised against the action of its tension spring 72 by means of a plate gauge 92 having a thickness $$hg = \frac{h_{max} + h_{min}}{2}$$

namely, $$\frac{.060" + .030"}{2}$$

or .045". The datum contacts 52 and 54 are then adjusted on the holder 78 so that the distance $d_4$ between the surfaces 88 and 90 and the datum contacts 52 and 54 represents ½ of the difference between $$h_{max} - h_{min} \left( i.e. \frac{.060 - .030}{2} = .015 \right)$$

When a basing head 16 indexes into Station "67," the solder-inspection station, and the datum shoe 76 and detecting shoe 80 are engaged by the top of the base-receiving nest 32 and the eyelet-solder connection 17, respectively, such shoes are moved upwardly, as viewed in FIGS. 2, 3 and 5, against the action of the springs 72, thereby causing similar upward movement of the datum contacts 52 and 54 and the contact bar 62.

Thus, if the height of the eyelet-solder connection 17 above the center eyelet contact 18 is within the predetermined limits namely $h_{max} - h_{min}$ (i.e. .060"—.030"), the above-described upward movement of the datum contacts 52 and 54 and contact bar 62 will not cause engagement between either the top surface 88 of the contact bar 62 and the lower-limit datum contact 52 or the bottom surface 90 and the upper-limit datum contact 54.

However, if the height of the eyelet-solder connection 17 above the center-eyelet contact 18 is greater than the predetermined upper limit namely $h_{max}$ (.060"), such above-described upward movement of the datum contacts 52 and 54 and the contact bar 62 will cause the bottom surface 90 of the latter to engage the upper-limit datum contact 54. If the height of the eyelet-solder connection 17 is below the lower limit $h_{min}$ (.030") the upper surface 88 of the contact bar 62 will engage the lower-limit datum contact 52. Such engagement in either case functions as a circuit-closing means in an "operating" circuit (FIGS. 1 and 5), which comprises a conductor 100 extending from the arm 82 to one side of the coil of a solenoid 102 (FIG. 1), a conductor 104 extending from the floating datum head 50 to one side of a suitable source of voltage, indicated by the legend "A.C. Voltage Supply," the other side of such voltage supply being connected by a conductor 106 to the other side of the coil of the solenoid 102.

Energization of the coil of the solenoid 102 causes operation of a conventional lamp-ejecting mechanism (FIG. 1) of the type shown in the hereinbefore mentioned U.S. application, Serial No. 449,482. Since this conventional lamp-ejecting mechanism per se forms no part of the present invention, only its operation will be briefly described.

Energization of the coil of the solenoid 102 causes an armature 110 of the solenoid 102 to move upwardly, as viewed in FIG. 1, from the solid-line position to the dotted-line position shown therein thereby causing (by means of a link 112 and lever 114) counterclockwise movement of a latch 116 (pivoted on a pulldown rod 118) from the solid-line position to the dotted-line position where such latch engages a dog 120. Shortly thereafter a cam 122 on a main-cam shaft 124 of the conveyor-type basing machine 10 causes (through a lever 126) the downward movement of the dog 120, latch 116, pulldown rod 118 and the bulb-supporting holder 34 which has a roller 128 in engagement with a lip on the upper portions of the pull-down rod 118. The downward movement of the bulb-supporting holder 34 moves the lamp 14 downwardly therewith, thereby permitting the base 16 to free itself from the base-receiving nest 32.

Near the end of the downward movement of the bulb-supporting holder 34, the depending end thereof causes closure of a normally-open switch 130 mounted on the frame of the conveyor-type basing machine 10, thereby closing an "operating" circuit to a valve-operating solenoid (not shown) which opens such valve to permit the flow of a blast of high-pressure air through a pipe 132 (FIG. 1) against the base portion 16 of the released lamp 14. This blast of air ejects the lamp 14 from the bulb-supporting holder 34 and into a disposal chute 134 leading to a suitable shrinkage container (not shown).

It will be recognized by those skilled in the art that the objects of the present invention have been achieved by the provision of an improved solder-inspection device for a conveyor-type basing machine, which inspection device accurately ascertains whether the height of the eyelet-solder connection above the center-eyelet contact is within certain specified limits. The improved inspection device automatically adjusts itself to compensate for variations in the height of the basing heads of the conveyor-type basing machine above the frame, when such basing heads enter the solder-inspection station.

While in accordance with the patent statutes one best known embodiment of the present invention has been illustrated and described in detail, it is to be particularly understood that the invention is not limited thereto or thereby.

We claim:

1. An article-inspection device for an inspection station of a conveyor-type fabricating machine having an article-supporting means movable from station to station and from which a portion of an article projects, said article-inspection device comprising movable datum means provided with a datum contact, an arcuate-shaped datum contact means said datum contact means being engageable by the article-supporting means as the latter moves into the inspection station to adjust the position of the datum contact with respect to the article-supporting means and thereby compensate for variations in the position of the article-supporting means, ejecting means for ejecting said article, and movable detecting means provided with an arcuate-shaped detecting contact means and a detecting contact disposed in operative relation to the datum contact to indicate the length of the projecting portion of the article by the relative position of such detecting contact with respect to the datum contact, said detecting contact means being engageable by the projecting portion of the article when the article-supporting means moves into the inspection station to cause movement of the detecting contact relative to the datum contact so that if the portion of the article projecting from the article-supporting means exceeds a predetermined limit, the detecting contact will engage the datum contact to cause actuation of said ejecting means and the ejection of the defective article.

2. An article-inspection device for an inspection station of a conveyor-type fabricating machine having an article-supporting means movable from station to station and from which a portion of an article projects, said article-inspection device comprising movable datum means provided with a pair of datum contacts and an arcuate shaped datum contact means, said datum contact means being engageable by the article-supporting means as the latter moves into the inspection station to adjust the position of the datum contacts with respect to the article-supporting means and thereby compensate for variations in the position of the article-supporting means, ejecting means for ejecting said article, and movable detecting means provided with an arcuate-shaped detecting contact means and a pair of detecting contacts disposed in operative relation to the datum contacts to indicate the height of the projecting portion of the article above the article-supporting means by the relative position of such detecting contacts with respect to the datum contacts, said detecting contact means being engageable by the projecting portion of the article when the article-supporting means moves into the inspection station to cause movement of the detecting contacts relative to the datum contacts so that if the projecting portion of the article projecting from the article-supporting means is not within predetermined limits, a detecting contact will engage a datum contact to cause actuation of said ejecting means and the ejection of the defective article.

3. An article-inspection device for an inspection station of a conveyor-type fabricating machine having an article-supporting means movable from station to station and from which a portion of an article projects, said article-inspection device comprising movable datum means provided with a pair of datum contacts and an arcuate-shaped datum contact means, said datum contact means being engageable by the article-supporting means as the latter moves into the inspection station to adjust the position of the datum contacts with respect to the article-supporting means and thereby compensate for variations in the position of the article-supporting means, a first resilient means connected to said datum means for biasing said datum contact means toward the path of movement of the article-supporting means into the inspection station, ejecting means for ejecting said article, movable detecting means provided with an arcuate-shaped detecting contact means and a pair of detecting contacts disposed in operative relation to the datum contacts to indicate the height of the projecting portion of the article above the article-supporting means by the relative position of such detecting contacts with respect to the datum contacts, said detecting contact means being engageable by the projecting portion of the article when the article-supporting means moves into the inspection station to cause movement of the detecting contacts relative to the datum contacts so that if the height of the projecting portion of the article above the article-supporting means is not within predetermined limits, a detecting contact will engage a datum contact to cause actuation of said ejecting means and the ejection of the defective article, and a second resilient means connected to said detecting means for biasing the detecting contact means toward the path of movement of the projecting portion of the article into the inspection station.

4. An article-inspection device for an inspection station of a conveyor-type fabricating machine having an article-supporting means movable from station to station and from which a portion of an article projects, said article-inspection device comprising a body, a movable datum member pivoted on said body and provided with an arcuate-shaped datum contact shoe and a pair of datum contacts, said datum contact shoe being engageable by the article-supporting means as the latter moves into the inspection station to adjust the position of the datum contacts with respect to the article-supporting means and thereby compensate for variations in the position of the article-supporting means, a first resilient means connected to said datum member for biasing said datum contact shoe toward the path of movement of the article-supporting means into the inspection station, ejecting means for ejecting said article, a movable detecting member also pivoted on said body and provided with an arcuate-shaped detecting contact shoe and a pair of detecting contacts disposed in operative relation to the datum contacts to indicate the height of the projecting portion of the article above the article-supporting means by the relative position of such detecting contacts with respect to the datum contacts, said detecting contact shoe being engageable by the projecting portion of the article when the article-supporting means moves into the inspection station to cause movement of the detecting contacts relative to the datum contacts so that if the height of the projecting portion of the article above the article-supporting means is not within predetermined limits, a detecting contact will engage a datum contact to cause actuation of said ejecting means and the ejection of the defective article, and a second resilient means connected to said detecting member for biasing the detecting contact shoe toward the path of movement of the projecting portion of the article into the inspection station.

5. A solder-inspection device for a solder-inspection station of a conveyor-type basing machine having a basing head movable from station to station and from which a portion of a lamp base on a lamp projects including an eyelet-solder connection, said solder-inspection device comprising a body, a movable datum member pivoted on said body and provided with a first arcuate-shaped contact member and a pair of datum contacts, said first contact member being engageable by the basing head as the latter moves into the inspection station to adjust the position of the datum contacts with respect to the basing head and thereby compensate for variations in the position of the basing head as the latter enters the inspection station, a first resilient means connected to said datum member for biasing said first contact member toward the path of movement of the basing head into the inspection station, ejecting means for ejecting said lamp, a movable detecting member also pivoted on the body and provided with a second arcuate-shaped contact member and a pair of detecting contacts disposed in operative relation to the datum contacts to indicate the height of the eyelet-solder connection above the basing head by the relative position of such detecting contacts with respect to the datum contacts, said second contact member being engageable by the eyelet-solder connection when the basing head moves into the inspection station to cause movement of the detecting contacts relative to the datum contacts so that if the height of the eyelet-solder connection above the basing head is not within predetermined limits, a detecting contact will engage a datum contact to cause actuation of said ejecting means and the ejection of the defective lamp, and a second resilient means connected to said detecting member for biasing the second contact member toward the path of movement of the eyelet-solder connection into the inspection station.

References Cited in the file of this patent

UNITED STATES PATENTS

| | | |
|---|---|---|
| 2,393,246 | Hallowell | Jan. 22, 1946 |
| 2,396,378 | Larsen | Mar. 12, 1946 |
| 2,451,615 | Flanagan | Oct. 19, 1948 |
| 2,556,413 | Boosey et al. | June 12, 1951 |
| 2,560,446 | Jagen | July 10, 1951 |
| 2,569,564 | Gulliet | Oct. 2, 1951 |